US011649190B2

(12) United States Patent
Paolella et al.

(10) Patent No.: US 11,649,190 B2
(45) Date of Patent: May 16, 2023

(54) CERAMICS, METHODS FOR THE PRODUCTION THEREOF AND USES OF SAME

(71) Applicant: HYDRO-QUÉBEC, Montréal (CA)

(72) Inventors: Andrea Paolella, Montreal (CA); Sylvio Savoie, Ste-Julie (CA); Vincent Gariepy, Drummondville (CA); Wen Zhu, Brossard (CA); Abdelbast Guerfi, Brossard (CA); Karim Zaghib, Longueuil (CA)

(73) Assignee: HYDRO-QUEBEC, Montreal (CA)

( * ) Notice: Subject to any disclaimer, the term of this patent is extended or adjusted under 35 U.S.C. 154(b) by 0 days.

(21) Appl. No.: 17/046,912

(22) PCT Filed: May 30, 2019

(86) PCT No.: PCT/CA2019/050740
§ 371 (c)(1),
(2) Date: Oct. 12, 2020

(87) PCT Pub. No.: WO2019/227218
PCT Pub. Date: Dec. 5, 2019

(65) Prior Publication Data
US 2021/0147299 A1 May 20, 2021

Related U.S. Application Data

(60) Provisional application No. 62/791,144, filed on Jan. 11, 2019, provisional application No. 62/678,020, filed on May 30, 2018.

(51) Int. Cl.
| | | |
|---|---|---|
| *C01D 15/00* | (2006.01) | |
| *C01D 15/02* | (2006.01) | |
| *C01F 17/00* | (2020.01) | |
| *C04B 35/50* | (2006.01) | |
| *C04B 35/48* | (2006.01) | |
| *C04B 35/626* | (2006.01) | |
| *H01M 10/0525* | (2010.01) | |
| *H01M 10/0562* | (2010.01) | |
| *H01M 4/02* | (2006.01) | |

(52) U.S. Cl.
CPC ............ *C04B 35/50* (2013.01); *C04B 35/48* (2013.01); *C04B 35/6261* (2013.01); *H01M 10/0525* (2013.01); *H01M 10/0562* (2013.01); *C04B 2235/424* (2013.01); *C04B 2235/425* (2013.01); *C04B 2235/762* (2013.01); *H01M 2004/027* (2013.01); *H01M 2004/028* (2013.01); *H01M 2300/0077* (2013.01)

(58) Field of Classification Search
CPC ......... C01D 15/00; C01D 15/02; C01F 17/10; C01B 25/30; C04B 2235/3203
See application file for complete search history.

(56) References Cited

U.S. PATENT DOCUMENTS

| | | | | |
|---|---|---|---|---|
| 6,702,961 | B2 * | 3/2004 | Barker | C01B 25/37 252/502 |
| 7,276,218 | B2 * | 10/2007 | Barker | H01M 4/525 429/231.95 |
| 7,629,084 | B2 * | 12/2009 | Chang | H01M 4/1397 429/231.95 |
| 2004/0185344 | A1 * | 9/2004 | Barker | H01M 10/0525 429/231.1 |
| 2005/0186476 | A1 | 8/2005 | Barker et al. | |
| 2006/0115732 | A1 | 6/2006 | Zaghib et al. | |
| 2010/0173160 | A1 | 7/2010 | Zaghib et al. | |
| 2011/0123858 | A1 | 5/2011 | Zaghib et al. | |
| 2013/0084406 | A1 | 4/2013 | Yada et al. | |
| 2014/0134504 | A1 | 5/2014 | Brown | |
| 2016/0060178 | A1 * | 3/2016 | Miyagawa | C04B 35/632 252/301.36 |

FOREIGN PATENT DOCUMENTS

| | | |
|---|---|---|
| CN | 101212049 A | 7/2008 |
| CN | 103022489 A | 4/2013 |
| CN | 103311528 A | 9/2013 |
| CN | 104979541 A | 10/2015 |
| CN | 105336980 A | 2/2016 |
| CN | 107394141 A | 11/2017 |
| JP | 2013073907 A | 4/2013 |
| WO | 2004008560 A2 | 1/2004 |

OTHER PUBLICATIONS

Office Action (Text the First Office Action) dated Jan. 19, 2022, by the China National Intellectual Property Administration in corresponding Chinese Patent Application No. 201980035754.1, and an English Translation of the Office Action. (27 pages).
Zhao, P. et al."Preparation of Li7La3Zr2O12 Solid Electrolyte by Isostatic Pressing Method", Battery Bimonthly, vol. 47, No. 3, Jun. 2017, pp. 133-136.
Chen, L. et al., PEO/garnet composite electrolytes for solid-state lithium batteries: From"ceramic-in-polymer" to "polymer-in-ceramic" Nano Energy, 2018, vol. 46, pp. 176-184.
Hongxia, G. et al.,"Formation Mechanism of Garnet-Like Li1La3Zr2O12 Powder Prepared by Solid State Reaction" Rare Metal Mater. Eng., 2016, vol. 45, pp. 612-616.
Hubaud, A. A. et al.,"Low temperature stabilization of cubic (Li7_xAlx/3) La3Zr2O12: role of aluminum during formation" J. Mater. Chemsitry A, 2013, vol. 1, pp. 8813-8818.
Kim, J. & Lee, H.,"Thermal and Carbothermic Decomposition of Na2CO3 and Li2CO3" Metall. Mater. Trans. B, 2001, vol. 32, pp. 17-24.
Li, C., "Gallium Substitution in Zirconate-Based Fast Ionic Conducting Ceramics." Aug. 2016, All Theses, Clemson University, 2457, 99 pages.

(Continued)

*Primary Examiner* — Karl E Group
(74) *Attorney, Agent, or Firm* — Buchanan Ingersoll & Rooney P.C.

(57) ABSTRACT

This document describes processes for preparing ceramics, especially lithium-based ceramics. The ceramics produced by this process and their use in electrochemical applications are also described as well as electrode materials, electrodes, electrolyte compositions, and electrochemical cells comprising them.

26 Claims, 8 Drawing Sheets

(56) References Cited

OTHER PUBLICATIONS

Li, Y. et al.,"Garnet electrolyte with an ultra-low interfacial resistance for Li-metal batteries" J. Am. Chem. Soc., 2018, Just Accepted Manuscript, pp. 1-12.

Shin, D. O. et al.,"Synergistic multi-doping effects on the Li7La3Zr2O12 solid electrolyte for fast lithium ion conduction" Sci. Rep., 2015, vol. 5, 18053, pp. 1-9.

Stephan, A. M. et al.,"Review on composite polymer electrolytes for lithium batteries" Polymer (Guildf), 2006, vol. 47, pp. 5952-5964.

Xu, R. et al.,"Artificial Soft-Rigid Protective Layer for Dendrite-Free Lithium Metal Anode" Adv. Funct. Mater., 2018, vol. 28, 1705838, pp. 1-7.

International Search Report (PCT/ISA/210) and translation and Written Opinion (PCT/ISA/237) dated Aug. 28, 2019, by the Canadian Patent Office as the International Searching Authority for International Application No. PCT/CA2019/050740.

Wu, et al., "Preparation of high tap density LiFePO4/C through carbothermal reduction process using beta-cyclodextrin as carbon source", Int J. Electrochem. Sci., Feb. 2018, pp. 2958-2968, vol. 13.

Office Action (Text of the Second Office Action) dated Jul. 8, 2022, by the China National Intellectual Property Administration in corresponding Chinese Patent Application No. 201980035754.1, and an English Translation of the Office Action. (20 pages).

The partial supplementary European search report dated Sep. 9, 2022, issued by the European Patent Office in corresponding European Application No. 19811540.4-1108, with English translation, (35 pages).

Extended European search report (R. 164 EPC) dated Jun. 9, 2022, issued by the European Patent Office in corresponding European Application No. 19811540.4-1108, with English translation, (32 pages).

\* cited by examiner

CERAMICS, METHODS FOR THE PRODUCTION THEREOF AND USES OF SAME

RELATED APPLICATIONS

The present application claims priority, under applicable law, from U.S. provisional patent application No. 62/678,020 filed on May 30, 2018 and U.S. provisional patent application No. 62/791,144 filed on Jan. 11, 2019, the content of which is incorporated herein by reference in its entirety and for all purposes.

TECHNICAL FIELD

The technical field generally relates to ceramics and their use in solid electrolytes, their methods of preparation and electrochemical cells containing them.

BACKGROUND

An important phenomenom responsible for capacity loss and/or failure of a lithium battery is the formation of metallic lithium dendrites through the electrolyte and separator, thereby short-circuiting the battery. The use of metallic lithium anodes in batteries therefore preferably requires a solid electrolyte in order to prevent the formation of such lithium dendrites (see for example Xu, R. et al., *Adv. Funct. Mater.*, 2018, 1705838, 1-7). Recently, different types of solid electrolytes were explored, these being based on a polymer, a ceramic (e.g. LLZO) or a ceramic-polymer hybrid (e.g. a poly(ethylene oxide) and LLZO composite) (for example, see Stephan, A. M. & Nahm, K. S., *Polymer (Guildf)*, 2006, 47, 5952-5964; Hongxia, G. et al., *Rare Metal Mater. Eng.*, 2016, 45, 612-616; and Chen, L. et al., *Nano Energy*, 2018, Vol. 46, 176-184).

The preparation of ceramic-based solid electrolytes through solid state synthesis requires the use of a lithium salt (e.g. lithium carbonate) and a metal oxide, which are then treated at high temperatures (over 900° C.). One of the main problems associated with this technique is the components reaction with the crucible (Shin, D. O. et al., *Sci. Rep.*, 2015, 5, 18503). Long reaction times are also generally required for ceramic synthesis.

Kim et al. reported a carbothermic decomposition of $Li_2CO_3$ and $Na_2CO_3$ using carbon (Kim, J. & Lee, H., Metall. *Mater. Trans.* B, 2001, 32, 17-24). The use of carbon during lithium titanate ($Li_4Ti_5O_{12}$, also called LTO) and ceramics (such as LTO combined with $Y_2O_3$ and $ZrO_2$) synthesis was also presented by Zaghib et al. in US patent application publication No. US2010/0173160.

LLZO in cubic phase is generally prepared in the presence of dopants such as aluminum (Hubaud, A. A. et al., *J. Mater. Chemistry A* 1, 8813-8818 (2013)) or gallium (Li, C. "Gallium Substitution in Zirconate-Based Fast Ionic Conducting Ceramics." (2016) All Theses, Clemson University. 2457).

Accordingly, there is a need for alternative processes for the preparation of ceramics, for example, useful in the field of electrochemistry.

SUMMARY

An aspect of the present technology relates to a process for preparing a lithium-based ceramic. The process comprises at least the steps of:

a) mixing a source of lithium ion, at least one metal oxide or phosphate and a carbon material to obtain a mixture of powders; and
b) heating the mixture of powders obtained in step (a) at a treatment temperature;
  wherein the source of lithium ion used in step (a) has a melting point below the treatment temperature of step (b).

In one embodiment, step (b) is carried out under inert atmosphere and the process further comprises a step (c) of heating the product of step (b) in the presence of oxygen (for example, in air). Alternatively, step (b) is carried out in the presence of oxygen (e.g. in air). For instance, the heating step in the presence of air is performed for a period of time sufficient for eliminating the carbon material.

In another embodiment, the process further comprises a step (b)(i) of mixing the product obtained in step (b) with a metal oxide or phosphate and a carbon material; and (b)(ii) heating the mixture obtained in (b)(i) at a second treatment temperature to obtain a second product, wherein the product of step (b) has a melting point above the treatment temperature of step b(ii).

In an embodiment, the at least one metal oxide or phosphate is an oxide or phosphate of a metal selected from zirconium, titanium, germanium, gallium, tantalum, iron and niobium. For instance, the at least one metal oxide or phosphate comprises at least two oxides or phosphates of metals selected from lanthanum, aluminum, zirconium, titanium, germanium, gallium, tantalum, iron and niobium, provided that at least one metal is lanthanum or aluminum. According to another example, the at least one metal oxide or phosphate comprises at least three metal oxides or phosphates.

In yet another embodiment, the at least one oxide or phosphate is an oxide of lanthanum or aluminum. For instance, the at least one oxide or phosphate is an oxide of lanthanum and the process further comprises a second metal oxide selected from zirconium oxide and titanium oxide. The process may also comprise a third oxide of an element selected from aluminium, germanium, gallium, tantalum, niobium, iron, barium, boron, and silicon.

In any one of the above embodiments, the "lithium ion:carbon" molar ratio is within the range of 0.50 to 2.4, with the lithium ion coming from the source of lithium ion.

A second aspect of the present technology relates to a process for preparing a ceramic, the process comprising the steps of:

a) mixing lithium carbonate, a first metal oxide, and a carbon material to obtain a first mixture of powders;
b) heating the first mixture of powders from step (a) at a temperature of at least 800° C.;
c) mixing the product of step (b) with second metal oxide and optionally a third metal oxide, to obtain a second mixture of powders;
d) heating the second mixture of powders obtained in step (c) at a temperature of at least 800° C.;
  wherein the first metal oxide is different from the second metal oxide.

In one embodiment, the first metal oxide comprises at least one metal oxide selected from zirconium oxides, titanium oxides, germanium oxides, gallium oxides, tantalum oxides, iron oxides, and niobium oxides. In another embodiment, the second and third metal oxides comprise at least one metal oxide selected from lanthanum oxides, zirconium oxides, and aluminum oxides. According to a further embodiment, the product of step (b) comprises a lithium metal oxide of Formula $Li_5M'O_4$ or $Li_5M'''O_5$, wherein $M^v$ is Ga, Al or Fe, and MW is Ta or Nb. In some embodiments, mixing step (c) comprises the third metal oxide. The mixing step may also further comprise a phosphate salt.

Preferably, the "Li$_2$CO$_3$:carbon" molar ratio is within the range of from 0.25 to 1.2.

According to an embodiment of the two processes described above, the carbon material is selected from carbon black (such as acetylene black, Ketjen™ black, etc.), graphene, graphite, carbon nanotubes, carbon fibers or nanofibers, and combinations thereof.

The heating step of the processes described above may be carried out at a temperature within the range of 800 to 1400° C., for example, for a period of time in the range of 30 minutes to 3 hours, or of 45 minutes to 1.5 hours, preferably for a period of about 1 hour.

A third aspect of the present technology relates to a process for preparing a ceramic, the process comprising the steps of:
a) mixing lithium carbonate (Li$_2$CO$_3$), a first metal oxide, and a second metal oxide to obtain a mixture of powders;
b) heating the mixture of powders obtained in step (a) under a flow of inert gas up to a first temperature below the temperature of decomposition of Li$_2$CO$_3$;
c) stopping the flow of inert gas of step (b) and thermally treating at a second temperature above the first temperature;
wherein the first metal oxide is different from the second metal oxide.

According to one embodiment, the first metal oxide is of the formula M$^z_2$O$_3$, wherein M$^z$ is a metal of oxidation state III (such as La, Al, Ga, etc.), preferably M$^z$ is lanthanum. In another embodiment, the second metal oxide is a dioxide of a metal in oxidation state (IV) (such as Zr, Ti, Ge, etc.), preferably the second metal oxide is zirconium dioxide. According to another embodiment, the ceramic comprises a compound having a cubic crystal structure.

In some embodiments, the first temperature is equal to or below 800° C., or equal to or below 750° C., or equal to or below 700° C. According to an embodiment, the second temperature is comprised in the range of 800 to 1400° C., or comprised in the range of 800 to 1200° C., or comprised in the range of 850 to 1100° C., or comprised in the range of 900 to 1000° C. For instance, the heating in step (b) is performed for a period of time in the range of 30 minutes to 3 hours, or of 1 hour to 3 hours, or a period of about 2 hours.

According to an embodiment of this third aspect, step (a) further comprises a carbon material, for instance, selected from carbon black (such as acetylene black, Ketjen™ black, etc.), graphene, graphite, carbon nanotubes, carbon fibers or nanofibers, and combinations thereof. According to another embodiment of this third aspect, step (a) is free of added carbon material.

According to one embodiment, the mixing step of one or the other of the above described processes is carried out by ball milling or in a planetary mixer. Preferably, mixing is performed by ball milling, for instance, in a zirconium dioxide container, using zirconium dioxide balls.

A fourth aspect relates to a ceramic obtained or obtainable by a process as defined in the present document. According to one embodiment, the ceramic comprises a compound selected from the compounds of Formulae (I) to (IV):

(I)

(II)

(III)

(IV)

wherein:
M is selected from Al, Ga, Ta, Fe, and Nb;
M$^x$ is selected from Ti and Ge;
M$^y$ is selected from Ba, B, Al, Si and Ta;
x is within the range of 0 to 1;
y is greater than 0 and less than or equal to 0.67;
y' is within the range of 0 to less than 1; and
z is within the range of 0 to 1.

According to one embodiment, the compound comprises ionic vacancies. According to another embodiment, the compound does not comprise ionic vacancies.

In one embodiment, the compound is of Formula (I), for example, having a tetragonal or cubic crystal structure. In another embodiment, the compound is of Formula (II), for example, having a tetragonal or cubic crystal structure. According to one example, the compound is of Formula (I) or (II) and of cubic crystal structure. According to another example, the compound is an undoped compound of Formula (I) and has a cubic crystal structure. According to another embodiment, the compound is of Formula (III), for example, having a perovskite-type crystal structure. According to a further embodiment, the compound is of Formula (IV), for example, having a NASICON-type crystal structure.

According to one embodiment, the ceramic has a residual carbon content below 10% by weight, or a residual carbon content below 5% by weight, or even below 2% by weight, or below 1% by weight. According to another embodiment, the ceramic is free of residual carbon.

A fifth aspect relates to an electrolyte comprising a ceramic as defined in the present document. According to one example, the electrolyte is a solid electrolyte. According to one embodiment, the electrolyte further comprises a polymer, a solvent (such as a polar aprotic solvent) or a combination thereof. Preferably, the electrolyte presents an ionic conductivity within the range of 10$^{-5}$ to 10$^{-3}$ S/cm.

A sixth aspect relates to an electrode material comprising a ceramic as herein defined, for example, the electrode material further comprising an electrochemically active material and optionally a binder and/or an electronically conductive material.

According to a seventh aspect, this document relates to an electrochemical cell comprising a negative electrode, a positive electrode and an electrolyte, wherein at least one of these three elements comprises the present ceramic. In one embodiment, the electrolyte is as defined in the present document. In another embodiment, the positive or negative electrode comprises an electrode material as defined in the present document. In a further embodiment, the positive or negative electrode comprises an electrode material as defined herein, and the electrolyte is as defined herein. Other aspects relate to a battery comprising at least one electrochemical cell as defined herein, for instance, the battery being a lithium or lithium-ion battery.

DETAILED DESCRIPTION

All technical and scientific terms and expressions used herein have the same definitions as those commonly understood by the person skilled in the present technological field. Definitions of some terms and expressions used are nevertheless provided below for clarity purposes.

When the term "approximately" or its equivalent term "about" are used herein, it means in the region of, and around. For example, when the term "approximately" or "about" is used in relation to a numerical value, it can modify it above and below by a variation of 10%, or of 5%, with respect to the nominal value. This term may also take into account, for instance, the experimental error of a measuring device or rounding.

This document presents a new process for the preparation of lithium-based ceramics for use in electrochemical applications, in electrolyte compositions as well as in cathode and anode materials. This method uses a sacrificial carbon additive which is later eliminated during a thermal treatment. For instance, the carbon additive may serve as a dispersant or surfactant when a lithium ion source having a melting point below the thermal treatment temperature is used, such as lithium carbonate. For instance, this dispersion may assist in obtaining a uniform particle distribution and smaller ceramic particles size, i.e. a particle size smaller than that of their commercial equivalents. The process is also simple and economical and/or requires shorter reaction times.

Accordingly, the present process for the preparation of a lithium-based ceramic comprises at least a step of mixing a source of lithium ions, at least one metal oxide or phosphate and a carbon material to provide a powder mixture, and heating this powder mixture at a given treatment temperature. Preferably, the source of lithium ions is a lithium salt having a melting point below the treatment temperature. For instance, the lithium salt has a melting point below 800° C., such as lithium carbonate. Lithium carbonate may be used in a $Li_2CO_3$:carbon molar ratio between 0.25 and 1.2, or between 0.5 and 1.1. For instance, the Li:carbon molar ratio is between 0.50 and 2.4, or between 1 and 2.2.

It is understood that the process may comprise one sequence of mixing/heating steps, or comprise two or more mixing/heating sequences. In the latter, the first mixing/heating sequence of steps comprises mixing the source of lithium ions and at least one metal oxide or phosphate and the carbon material, and heating the mixture to obtain a first lithiated metal oxide compound. This compound is then mixed, in a second mixing step, with at least one additional metal oxide or phosphate and a carbon material, and the mixture obtained is heated at a second treatment temperature. The carbon may come from the first mixing/heating sequence if the first heating was carried out under conditions which did not lead to its elimination (e.g., heating under inert atmosphere, at a temperature and/or for a period insufficient to burn the carbon material completely or partially). The carbon material may also be a second carbon material which may be added in the second mixing step. In this case, the second carbon material may be of the same nature as the first carbon material or different.

The carbon material may be carbon in any known form, preferably commercially available, such as carbon black (e.g. acetylene black, Ketjenblack™, etc.), graphene, graphite, carbon nanotubes, carbon nanowires, carbon fibers or nanofibers, or one of their combinations.

When the process includes two mixing/heating sequences of steps, the product of the first sequence preferably has a melting temperature above the treatment temperature of the first heating step.

According to one variant, the heating step or steps are performed in the presence of oxygen and the carbon material is eliminated by combustion. According to another variant, the heating step or steps are performed under inert atmosphere (e.g. under argon) and the process comprises an additional heating step in the presence of oxygen to eliminate the carbon source by combustion. The term "eliminate" may include complete elimination as well as partial or substantial elimination, for example, a residual carbon content below 10 wt. %, or below 5 wt. %, or below 2 wt. %, or even below 1 wt. %.

For example, the metal oxide or phosphate is an oxide or phosphate of a metal selected from lanthanum, aluminum, zirconium, titanium, germanium, gallium, tantalum, iron and niobium. The process comprises the reaction of at least two metal oxides or phosphates, together with the lithium ion source, in a single mixing/heating sequence of steps or each in a separate mixing/heating sequence.

Examples of first metal oxides or phosphates include oxides or phosphates of a metal which may be selected from zirconium, titanium, germanium, gallium, tantalum, iron and niobium. Examples of a second metal oxide include lanthanum oxide and aluminum oxide. For example, the process comprises oxides or phosphates of at least two metals selected from lanthanum, aluminum, zirconium, titanium, germanium, gallium, tantalum, iron and niobium, provided that at least one metal is lanthanum or aluminum. One example also comprises three metal oxides or phosphates.

The present process can comprise the following non-limiting examples of combinations of metal oxides (in addition to lithium ion-based materials and optionally carbon):

oxides of La and Zr, optionally in the presence of an oxide of Al, Ge, Ga, Ta, Nb, or Fe;

oxides of La and Ti, optionally in the presence of an oxide of Ba, B, Al, Ta, or Si; and an oxide of Al and an oxide of Ti or Ge, in the presence of phosphate ions (preferably ammonium phosphate, e.g. $[NH_4][H_2PO_4]$).

A further example of the present process comprises the following steps:

a) mixing $Li_2CO_3$, a first metal oxide, and a carbon material to obtain a first mixture of powders;

b) heating the first mixture obtained in step (a) at a temperature of at least 800° C.;
c) mixing of the product of step (b) with a second metal oxide and optionally a third metal oxide, to obtain a second mixture;
d) heating the second mixture obtained in step (c) at a temperature of at least 800° C.;
   wherein the first metal oxide is different from the second metal oxide.

Examples of first metal oxide comprise at least one metal oxide selected from zirconium, titanium, germanium, gallium, tantalum, iron, and niobium oxides. For example, the second oxide may comprise at least one metal oxide selected from lanthanum, zirconium, and aluminum oxides.

According to an example, the product of step (b) comprises a lithium metal oxide of Formula $Li_5M^vO_4$ or $Li_5M^wO_5$, where $M^v$ is Ga, Al or Fe, and MW is Ta or Nb.

The mixing step or steps in the present process may be performed by any method known in the field such as ball milling, planetary mixer, etc. Preferably, the mixing step or steps are performed by ball milling, for instance, in a zirconium dioxide jar with zirconium dioxide balls.

As indicated above, the heating steps may be performed in the presence of oxygen (with carbon elimination) or under inert atmosphere, provided that a last heating step is performed in the presence of oxygen for carbon reaction and its elimination. For instance, step (b) is performed under inert atmosphere and step (d) is carried out in the presence of oxygen. According to one variant, steps (b) and (d) are performed under inert atmosphere and the process comprises a further step (e) of heating in the presence of oxygen at a temperature of at least 800° C. Heating steps in the present process are performed in a crucible resistant to temperatures of at least 800° C., for example in a graphite or alumina crucible.

Alternatively, the present process comprises the steps of:
a) mixing $Li_2CO_3$, a first metal oxide, and a second metal oxide to obtain a mixture of powders;
b) heating the mixture of powders obtained in step (a) under a flow of gas (e.g. an inert gas such as argon or nitrogen) up to a first temperature below the decomposition temperature of $Li_2CO_3$;
c) stopping the flow of gas of step (b) and thermally treating at a second temperature above the first temperature;
   wherein the first metal oxide is different from the second metal oxide.

In one example of this alternative process, the first metal oxide is of formula $M^z{}_2O_3$, where $M^z$ is a metal of oxidation state III, such as La, Al, Ga, and the like. For instance, the first oxide is lanthanum oxide. In another example, the second metal oxide may be any metal oxide, for instance, dioxides of metals in oxidation state (IV). Examples of second oxides include oxides of zirconium, titanium, germanium, etc. Preferably, the second oxide is a zirconium oxide. In some cases, using this process may provide a compound having a cubic crystal structure while avoiding the use of a doping element. Therefore, the obtained ceramic can comprise a compound having a cubic crystal structure.

In this process, the first temperature is generally equal to or below 800° C., or equal to or below 750° C., or equal to or below 700° C., and the second temperature is comprised between 800 and 1400° C., or between 800 and 1200° C., or between 850 and 1100° C., or between 900 and 1000° C. For instance, the thermal treatment of step (b) may be carried out for a period comprised between 30 minutes and 3 hours, or between 1 hour and 3 hours, or about 2 hours. The process mixing step may be carried out by ball milling or in a planetary mixer, for instance, by ball milling in a zirconium dioxide container, using zirconium dioxide balls.

In this alternative process, mixing step (a) may be performed with or without addition of a carbonaceous material. When added, the carbonaceous material may be selected from carbon black (e.g. acetylene black, Ketjenblack™, etc.), graphene, graphite, carbon nanotubes, carbon fibers or nanofibers, and combinations thereof. According to one example, mixing step (a) of this process excludes the addition of a carbon material.

Ceramics obtainable by the present process are also contemplated. As indicated above, the ceramics produced by the present process may have a uniform particle distribution and a smaller ceramic particles size, for instance, a particle size smaller than commercially available equivalents.

For example, the ceramics comprise a compound of at least one of the following Formulae (I) to (IV):

(I)

(II)

(III)

(IV)

wherein:
M is selected from Al, Ga, Ta, Fe, and Nb;
$M^x$ is selected from Ti and Ge;
$M^y$ is selected from Ba, B, Al, Si and Ta;
x is within the range of 0 to 1;
y is greater than 0 and less than 0.67;
y' is greater than 0 and less than 1; and
z is within the range of 0 to 1.

Any one of the above compounds may further comprise ionic vacancies (not shown). The ceramic may also comprise a mixture of oxides and/or phosphates. For instance, the ceramic is a mixture of a compound of one of the above formulae and of at least one other metal oxide. The ceramic may also comprise a compound of one of the above formulae and further include a doping material, for example, an additional metal oxide. Preferably, the ceramic comprises at least 50 wt. % of a compound of one of Formulae I to IV, or at least 60 wt. %, or at least 70 wt. %, or at least 80 wt. %, or at least 90 wt. %, or even at least 90 wt. %.

The ceramic may comprise a compound of Formula (I) or (II), for instance, having a tetragonal or cubic crystal structure, or a mixture thereof. For example, the compound may be an undoped compound of Formula (I) having a cubic crystal structure. Alternatively, the ceramic may comprise a compound of Formula (III), for instance, having a perovskite-type crystal structure. According to another alternative, the ceramic comprises a compound of Formula (IV), for instance, having a NASICON-type crystal structure.

The ceramic may be free or substantially free of carbon or may comprise a residual carbon content below 10 wt. %, or below 5 wt. %, or below 2 wt. %, or even below 1 wt. %.

The above ceramics are intended for use, for example, in electrochemistry, or anywhere a lithium ion exchange is required. For instance, the present description also contemplates electrolytes comprising one of the present ceramics, alone or in combination with other electrolyte elements such as other inorganic particles, lithium salts, separators, solvents, and solvating polymers. For instance, the electrolyte is a solid or gel electrolyte, preferably a solid electrolyte. The electrolyte preferably presents an ionic conductivity within the range of $10^{-5}$ to $10^{-3}$ S/cm.

For example, the solvent is a non-aqueous polar aprotic solvent. Examples of non-aqueous solvents include cyclic carbonates such as ethylene carbonate (EC), propylene carbonate (PC), butylene carbonate (BC), and vinylene carbonate (VC); acyclic carbonates such as dimethyl carbonate (DMC), diethyl carbonate (DEC), ethylmethyl carbonate (EMC), and dipropyl carbonate (DPC); lactones such as γ-butyrolactone (γ-BL) and γ-valerolactone (γ-VL); acyclic ethers such as 1,2-dimethoxyethane (DME), 1,2-diethoxyethane (DEE), ethoxymethoxyethane (EME), and trimethoxymethane; cyclic ethers such as tetrahydrofuran, 2-methyltetrahydrofuran, 1,3-dioxolane, and their derives; and other solvents such as dimethylsulfoxide, formamide, acetamide, dimethylformamide, acetonitrile, propylnitrite, nitromethane, phosphoric acid triester, sulfolane, methylsulfolane, and mixtures thereof.

Non-limiting examples of solvating polymers suitable for use in electrolytes include poly(ethylene oxide) and copolymers comprising ethylene oxide units, poly(propylene oxide) and copolymers comprising propylene oxide units, poly(dimethylsiloxane) and copolymers comprising dimethylsiloxane units, poly(alkylene carbonate) and copolymers comprising alkylene carbonate units, poly(alkylenesulfone) and copolymers comprising alkylenesulfone units, poly(alkylenesulfamide) and copolymers comprising alkylenesulfamide units, polyurethanes and copolymers comprising urethane units, poly(vinyl alcohol) and copolymers comprising vinyl alcohol units, and combinations thereof. Additionally, the solvating polymers may be linear but also branched or cross-linked.

The present description also further contemplates electrode materials comprising one of the present ceramics, for example in combination with other electrode material components such as an electrochemically active material, a conductive material, inorganic particles, lithium salts, and binders.

Examples of electrochemically active materials include, without limitation, titanates and lithium titanates (such as $TiO_2$, $Li_2TiO_3$, $Li_4Ti_5O_{12}$, $H_2Ti_5O_{11}$, $H_2Ti_4O_9$, or a combination thereof), lithiated metal phosphates (such as $LiMaPO_4$ where $M^a$ is Fe, Ni, Mn, Co, or a combination thereof), lithiated or non-lithiated vanadium oxides (such as $LiV_3O_8$, $V_2O_5$, $LiV_2O_5$, and the like), and other lithiated metal oxides such as $LiMn_2O_4$, $LiMbO_2$ (Mb being Mn, Co, Ni, or a combination thereof), $Li(NiM^c)O_2$ (MC being Mn, Co, Al, Fe, Cr, Ti, Zr, and the like, or a combination thereof), graphite, elemental sulfur, elemental selenium, iron(III) fluoride, copper(II) fluoride, lithium iodide and iodine, or a combination of two or more of these materials when compatible. For instance, the active material is selected from lithium iron phosphate (LFP), lithium manganese iron phosphate (LMFP), lithium titanate (LTO), lithium nickel cobalt aluminium oxide (NCA), lithium cobalt oxide (LCO) and lithium nickel manganese cobalt oxide (NMC). The particles may be freshly formed or of commercial source, in the form of microparticles or nanoparticles and may further include a carbon coating.

Examples of conductive materials include carbon black, Ketjen™ black, acetylene black, graphite, graphene, carbon fibers (or nanofibers) (for example, VGCF), carbon nanotubes, or a combination thereof.

Examples of binders include one of the above solvating polymers, as well as water soluble binders such as SBR (styrene butadiene rubber), NBR (butadiene acrylonitrile rubber), HNBR (hydrogenated NBR), CHR (epichlorohydrin rubber), ACM (alkyl acrylate rubber), and other similar binders, and cellulose-based binders (such as carboxyalkylcellulose and hydroxyalkylcellulose), or a combination of two or more of the foregoing binders. For instance, the carboxyalkylcellulose may be carboxymethylcellulose (CMC) or carboxyethylcellulose. Hydroxypropylcellulose is an example of hydroxyalkylcellulose. Other binder examples include fluorine-containing polymeric binders such as PVDF and PTFE.

The present description also relates to an electrochemical cell comprising at least one of the present ceramics in at least one of its components, i.e. in a material for positive or negative electrode or in the electrolyte. For instance, the electrochemical cell comprises an electrolyte as defined herein comprising the present ceramic, a negative electrode and a positive electrode.

The electrochemical cell may also comprise an electrolyte as defined herein comprising the present ceramic, a negative electrode and a positive electrode, where the negative electrode is as defined above and comprises at least one of the present ceramics.

The electrochemical cell may also comprise an electrolyte as defined herein comprising the present ceramic, a negative electrode and a positive electrode, where the positive electrode is as defined above and comprises at least one of the present ceramics.

An electrode material used in the present electrochemical cells may be prepared without adding the ceramic of the present invention, for instance, from an electrochemically active material as defined above as well as optional additional components, such as a conductive material, inorganic particles, salts and binders. An electrode material may also comprise a film of metallic lithium or an alloy thereof, such as an extruded lithium film, or be made from a material like graphite.

The present document also describes a battery comprising at least one electrochemical cell as defined herein. For example, the battery is a lithium or lithium-ion battery. Further uses of the present ceramics may also include electrochromic devices (ECDs) as well as optoelectronic devices.

EXAMPLES

The following non-limiting examples are for illustrative purposes and should not be construed as further limiting the scope of the present invention. These examples will be better understood with reference to the accompanying Figures.

Example 1—$Li_7La_3Zr_2O_{12}$ (LLZO)

Figure 1:
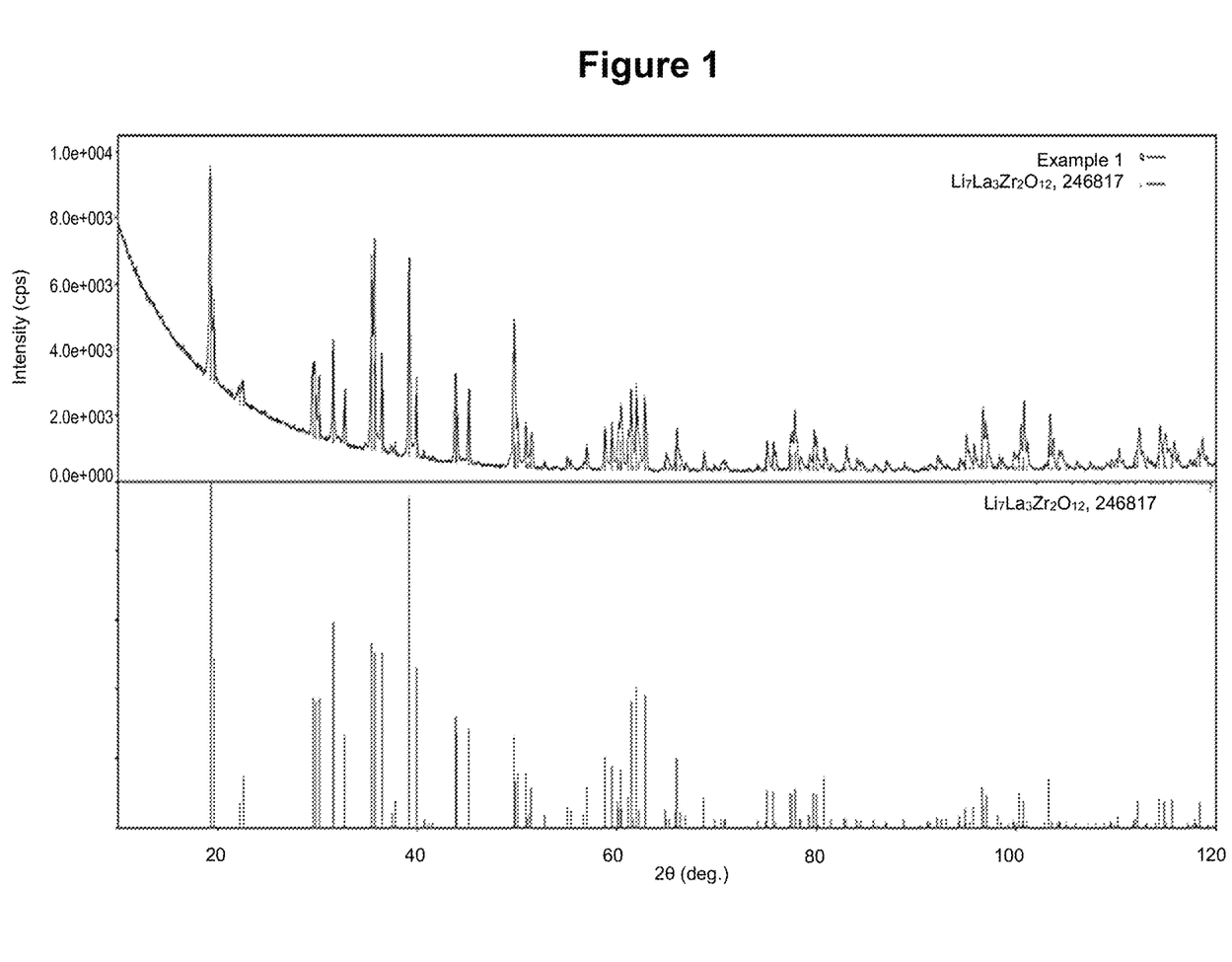
FIG. 1 displays the results of X-ray diffraction analysis of LLZO prepared according to Example 1 compared to a reference standard.

$Li_2CO_3$ (3.38 g), $La_2O_3$ (5.82 g), $ZrO_2$ (2.93 g), and acetylene black (0.500 g) were milled together in a zirconium oxide jar with zirconium oxide balls for 10 minutes. The powder thus obtained was then placed in an alumina crucible and heated in a stagnant air furnace at 900° C. for 1 hour. After cooling down to room temperature, the final powder was analyzed by X-ray diffraction and $Li_7La_3Zr_2O_{12}$ (LLZO) with tetragonal phase was observed (see FIG. 1).

Figure 2:
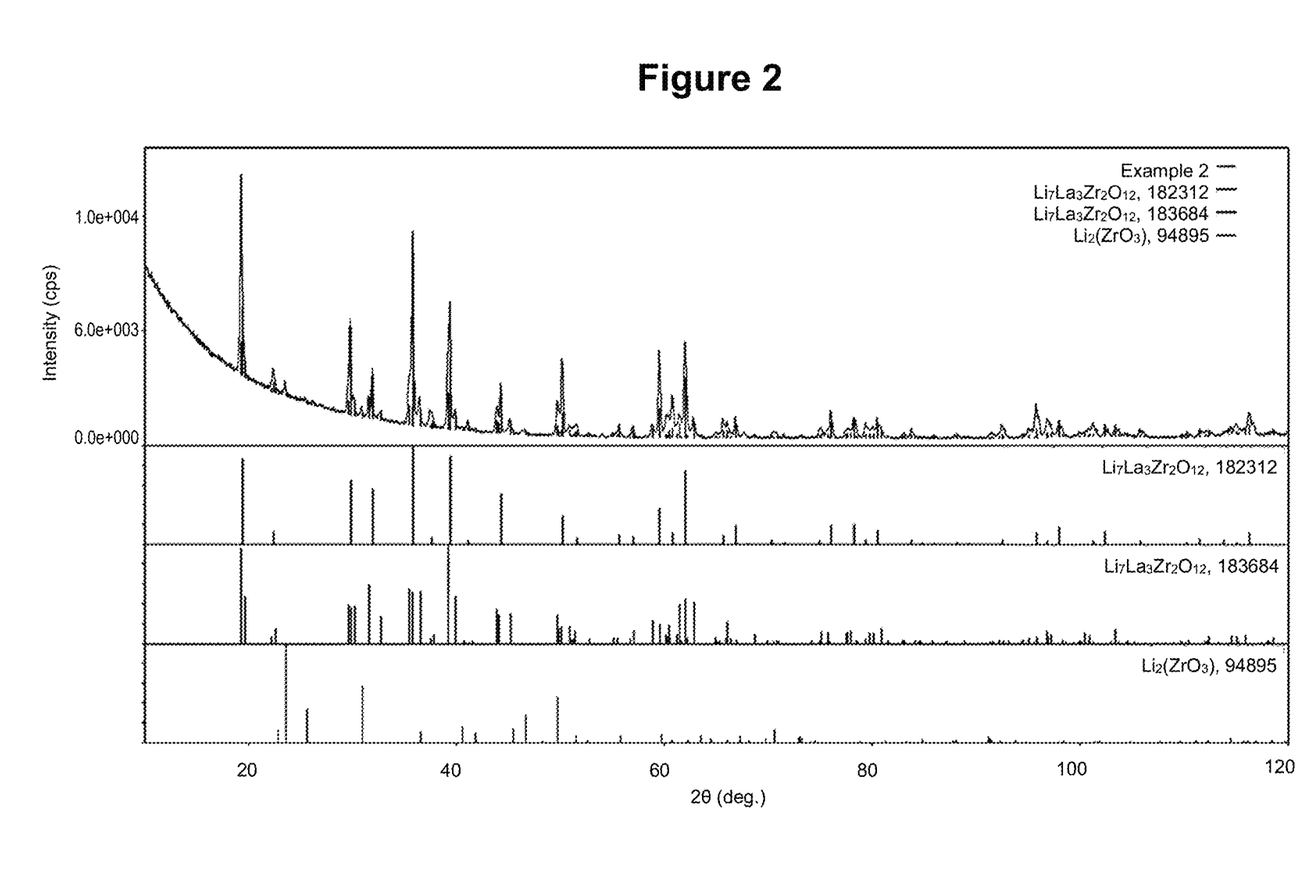
FIG. 2 shows the results of X-ray diffraction analysis of LLZO prepared according to Example 2 compared to reference standards.

Example 2: $Li_7La_3Zr_2O_{12}$ with $Al_2O_3$ $Li_2CO_3$ (2.99 g), $Al_2O_3$ (0.150 g), $La_2O_3$ (5.76 g), $ZrO_2$ (2.90 g), and acetylene black (0.500 g) were milled together in a zirconium oxide jar with zirconium oxide balls for 10 minutes. The powder thus obtained was then placed in an alumina crucible and heated in a stagnant air furnace at 900° C. for 1 hour. After cooling down to room temperature, the final powder was analyzed by X-ray diffraction. FIG. 2 shows that $Li_7La_3Zr_2O_{12}$ (LLZO) with a cubic structure was mainly observed along with $Al_2O_3$. Some tetragonal structure LLZO was also observed as minor phase.

Example 3: $Li_{1.3}Al_{0.3}Ti_{1.7}(PO_4)_3$ (LATP)

Figure 3:
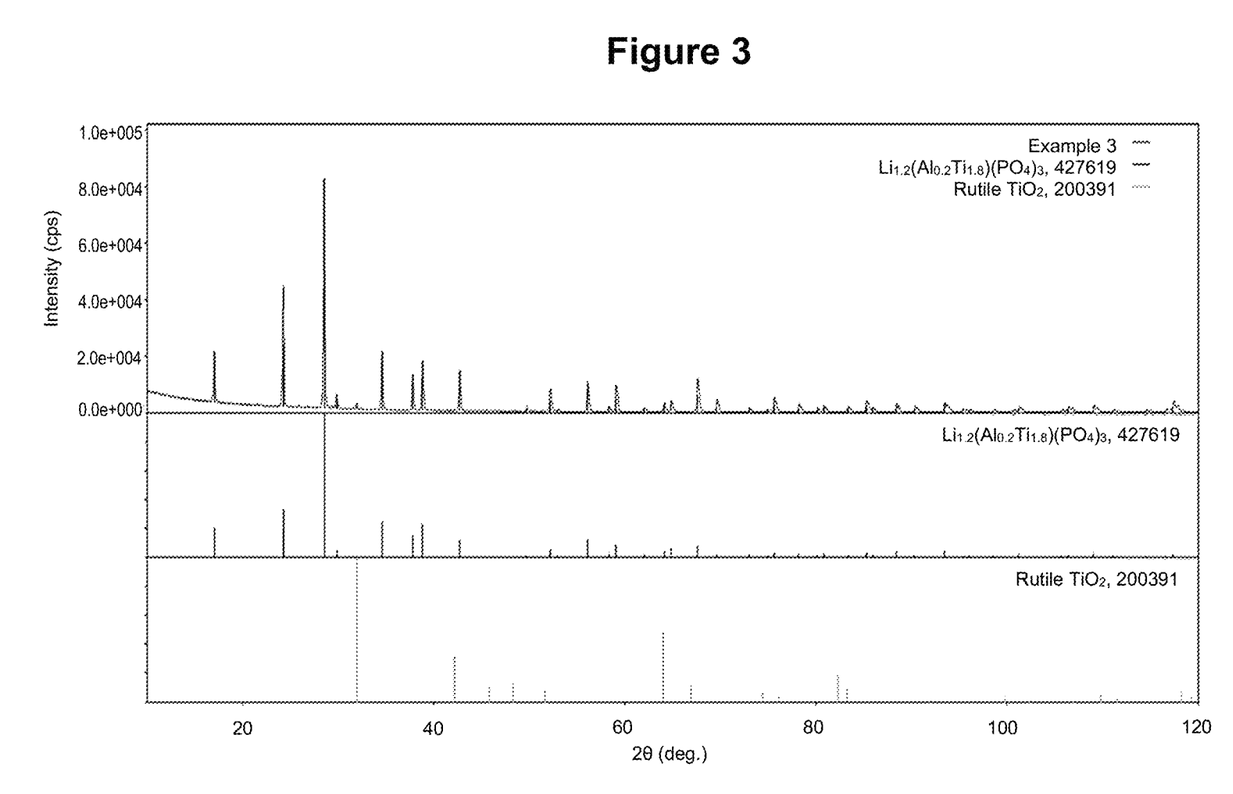
FIG. 3 presents the results of X-ray diffraction analysis of LATP prepared according to Example 3 compared to reference standards.

$Li_2CO_3$ (0.79 g), $Al_2O_3$ (0.22 g), $TiO_2$ (2.03 g), $NH_4H_2PO_4$ (5.17 g) and acetylene black (0.12 g) were milled together in a zirconium oxide jar with zirconium oxide balls for 10 minutes. The powder thus obtained was then placed in an alumina crucible and heated in a stagnant air furnace at 1000° C. for 1 hour. After cooling down, the final powder was analyzed by X-ray diffraction. $Li_{1.3}Al_{0.3}Ti_{1.7}(PO_4)_3$ (LATP) having a NASICON-type structure was observed as well as a $TiO_2$ minor phase (see FIG. 3).

Figure 4:
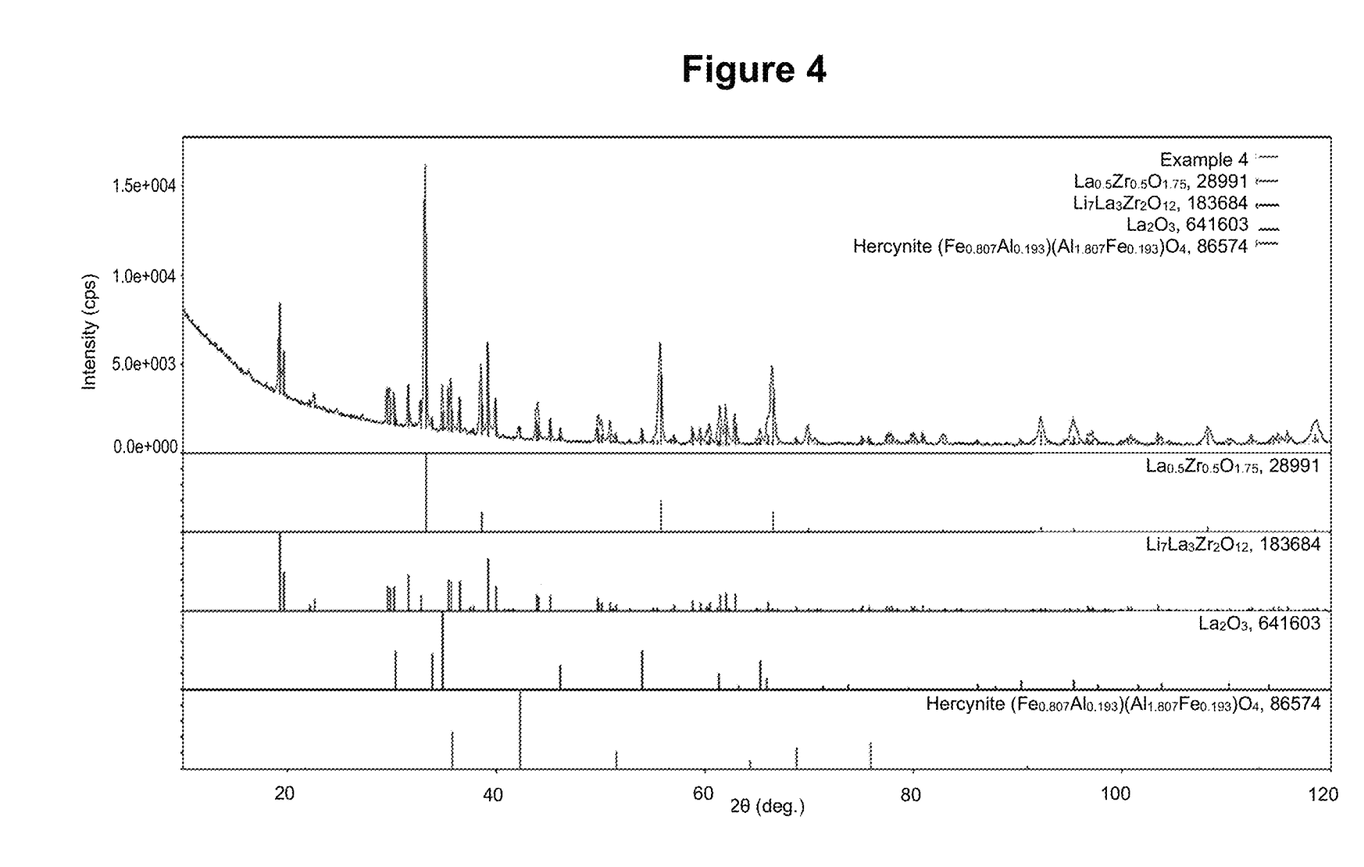
FIG. 4 shows the results of X-ray diffraction analysis of LLZO prepared according to Example 4 compared to reference standards.

Example 4: $Li_7La_3Zr_2O_{12}$ $Li_2CO_3$ (3.38 g), $La_2O_3$ (5.82 g), $ZrO_2$ (2.93 g), and acetylene lack (0.750 g) powders were milled together in a zirconium oxide jar with zirconium oxide balls for 10 minutes. The powder thus obtained was then placed in an alumina crucible and heated in a stagnant air furnace at 900° C. for 1 hour. After cooling down to room temperature, the final powder was analyzed by X-ray diffraction. $La_2Zr_2O_7$ (LZO) and $Li_7La_3Zr_2O_{12}$ (LLZO) having a tetragonal structure were observed (see FIG. 4).

Figure 5:
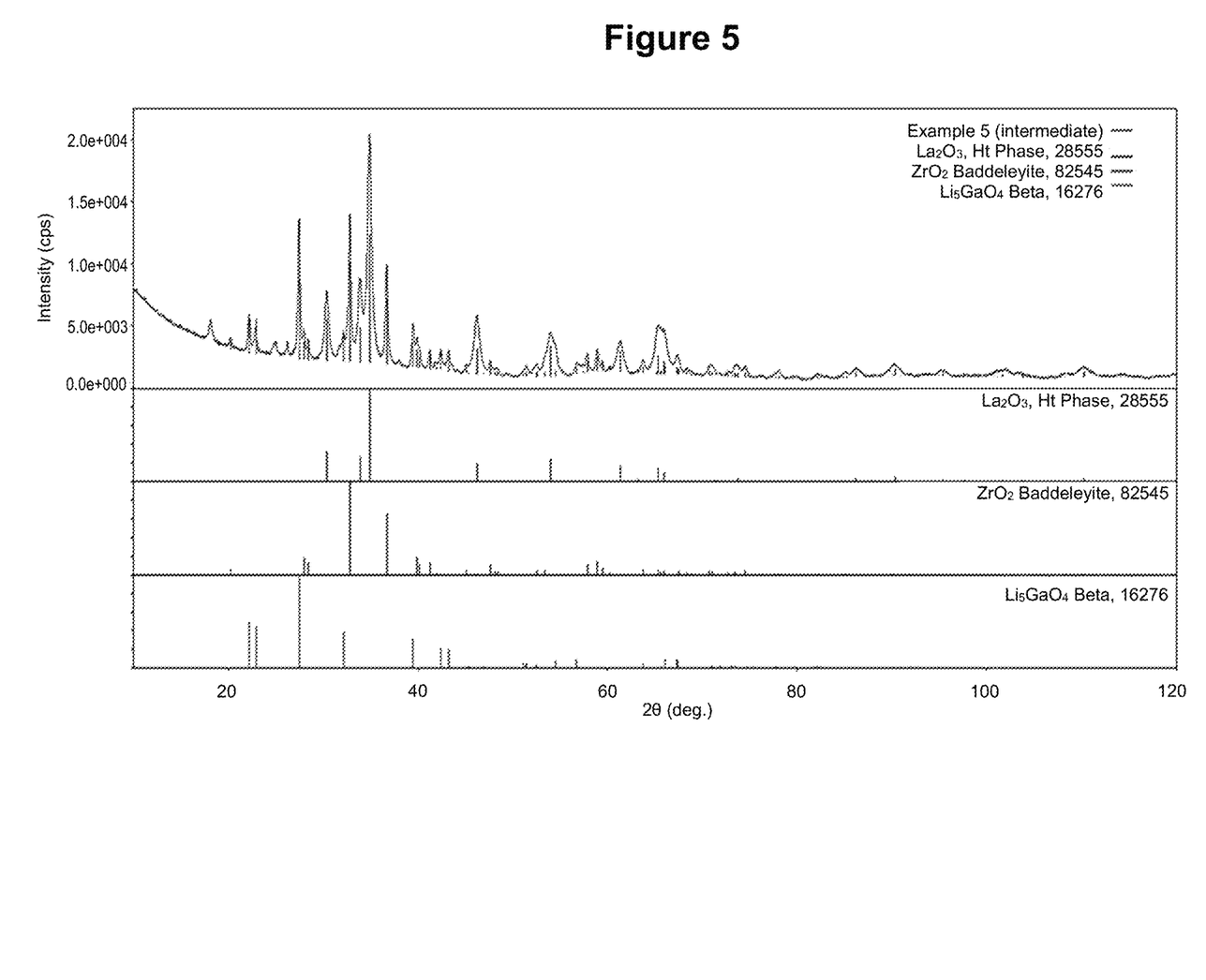
FIG. 5 displays the results of X-ray diffraction analysis of the mixture of $Li_5GaO_4$ with $La_2O_3$ and $ZrO_2$ prepared as intermediate in Example 5 compared to reference standards.
Figure 6:
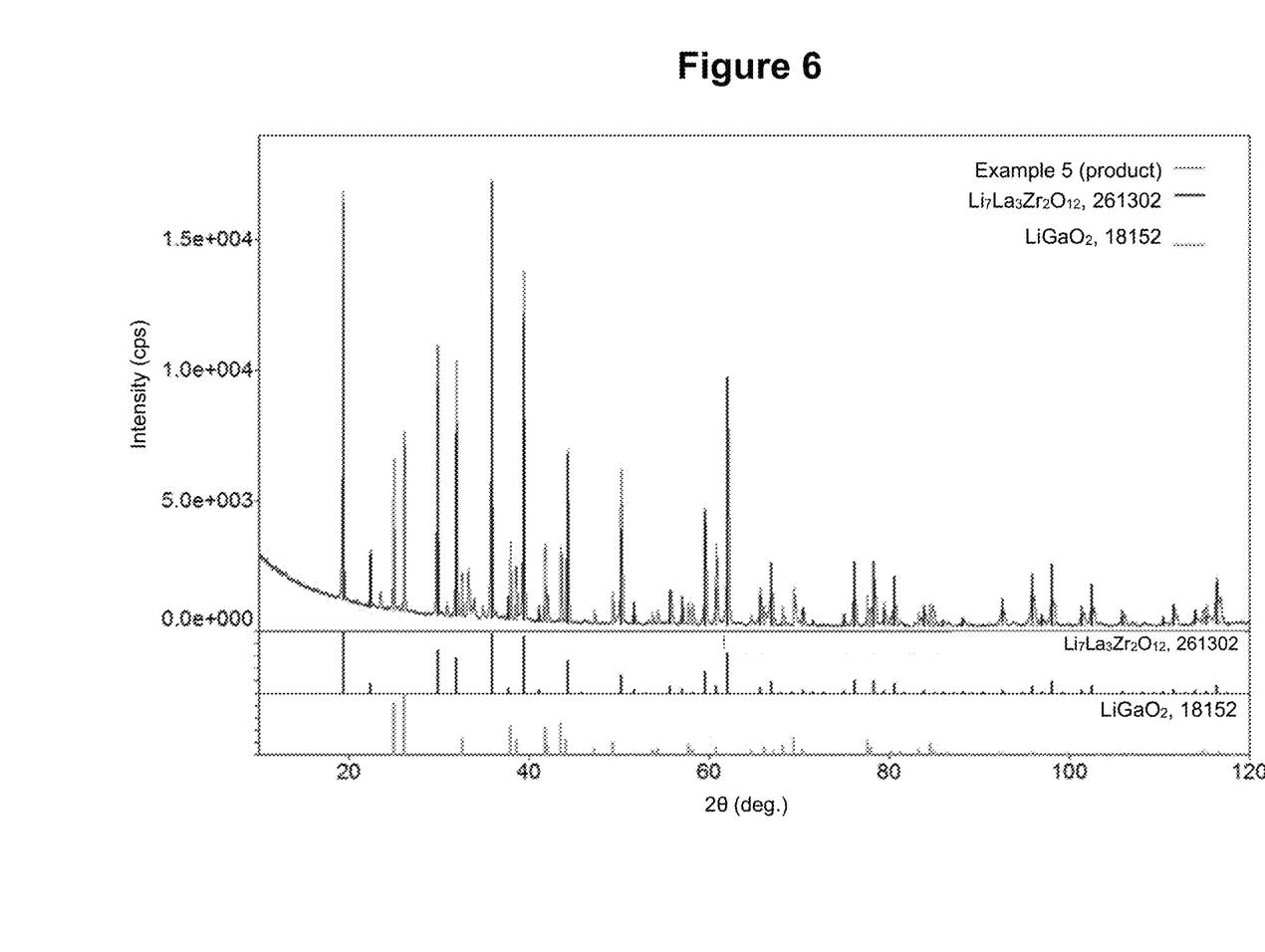
FIG. 6 presents the results of X-ray diffraction analysis of LLZO with $LiGaO_2$ prepared in Example 5 compared to reference standards.

Example 5: $Li_7La_3Zr_2O_{12}$ with $LiGaO_2$ $Li_2CO_3$ (3.83 g), $Ga_2O_3$ (1.94 g) and acetylene black (1.24 g) were milled together in a zirconium oxide jar with zirconium oxide balls for 10 minutes. The obtained powder was heated in a carbon crucible under argon atmosphere. The black powder (1.29 g) was then mixed with $La_2O_3$ (0.53 g) and $ZrO_2$ (0.26 g) and milled again in a zirconium oxide jar with zirconium oxide balls for 10 minutes. The intermediate powder was analyzed by X-ray diffraction showing the presence of $Li_5GaO_4$, $La_2O_3$ and $ZrO_2$ (see FIG. 5). This powder was then heated to 1200° C. in a graphite crucible under argon atmosphere, and finally heated under air in an alumina crucible at 900° C. for 1 hour. Analysis by X-ray diffraction made it possible to identify $Li_7La_3Zr_2O_{12}$ of cubic structure with $LiGaO_2$ (see FIG. 6).

Example 6—Cubic $Li_7La_3Zr_2O_{12}$ (LLZO) (without Doping)

$Li_2CO_3$ (6.77 g), $La_2O_3$ (11.94 g), and $ZrO_2$ (5.87 g), were mixed with zirconium oxide balls under air atmosphere for 10 minutes. The obtained powder was then heated in a tubular furnace on a graphite boat. The flow of nitrogen in the furnace was kept at 2 L/min from room temperature up to 700° C. The nitrogen flow was then stopped, and the temperature was increased until it reached 950° C. The powder was annealed at this temperature (950° C.) for 2 hours in static conditions without nitrogen flow and then cooled down. The obtained powder had a cubic structure as indicated in the X-ray diffraction pattern of FIG. 7(a).

Figure 7:
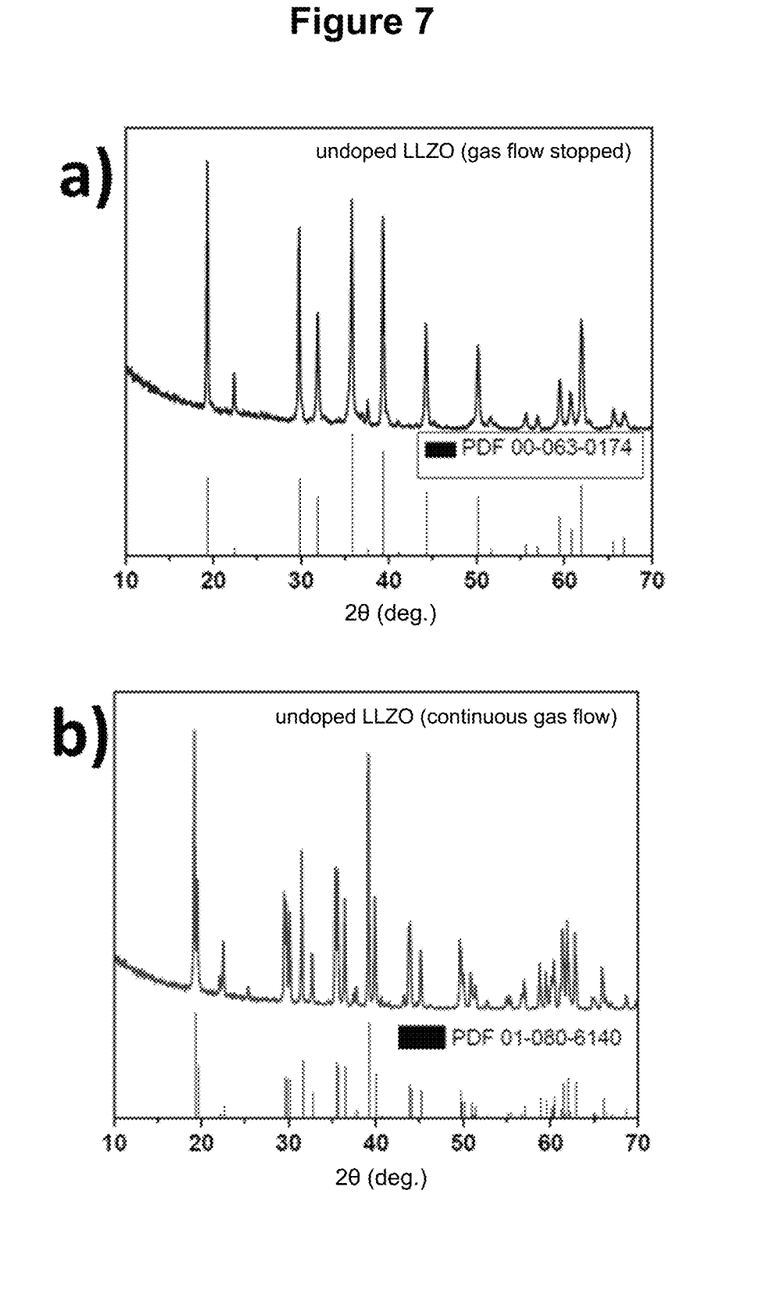
FIG. 7 shows the results of X-ray diffraction analysis of (a) cubic LLZO (heating without gas flow), and (b) tetragonal LLZO (heating with gas flow), compared to the reference standard, both LLZO being undoped and prepared according to Example 6.

Comparatively, if the same procedure was followed but while keeping the gas flow constant until the end, the powder obtained will have a tetragonal structure as observed by X-ray diffraction (see FIG. 7(b)).

Example 7—Cubic $Li_7La_3Zr_2O_{12}$ (LLZO) (with Carbon, without Doping)

Figure 8:
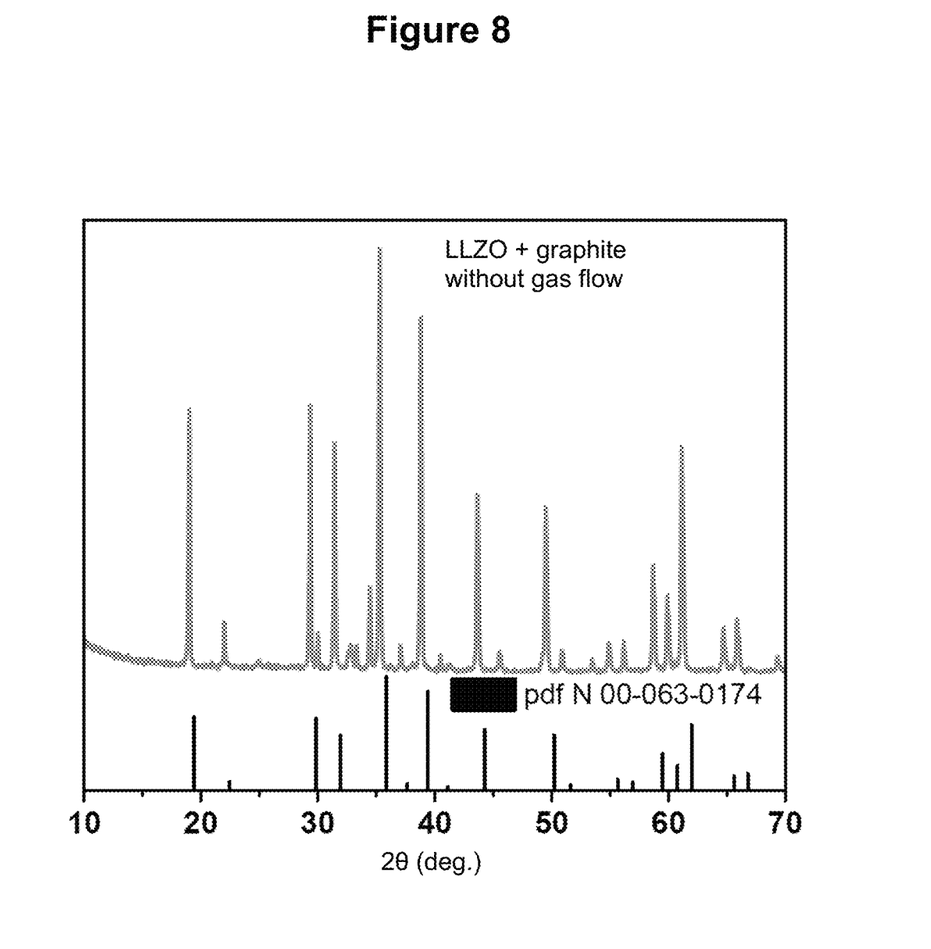
FIG. 8 shows the results of X-ray diffraction analysis of undoped cubic LLZO (annealed without gas flow in the presence of carbon), prepared according to Example 7, compared to a reference standard.

$Li_2CO_3$ (6.77 g), $La_2O_3$ (11.94 g), $ZrO_2$ (5.87 g), and graphite (1 g) were mixed with zirconium oxide balls under air atmosphere for 10 minutes. The obtained powder was heated in a tubular furnace on a graphite boat. The flow of nitrogen in the furnace was maintained at 2 L/min from room temperature up to 700° C. The nitrogen flow was then stopped, and the temperature was increased until it reached 950° C. The powder was annealed at this temperature (950° C.) for 2 hours in static conditions without nitrogen flow and then cooled down. The powder obtained had a cubic structure as indicated in the X-ray diffraction pattern of FIG. 8. Some $La_2Zr_2O_7$ was also detected as an impurity.

Numerous modifications could be made to any of the embodiments described above without departing from the scope of the present invention as contemplated. References, patents or scientific literature documents referred to in the present application are incorporated herein by reference in their entirety for all purposes.

The invention claimed is:

1. Process for preparing a lithium-based ceramic, the process comprising at least the steps of:
   a) mixing a source of lithium ion, at least one metal oxide or phosphate and a carbon material to obtain a mixture of powders; and
   b) heating the mixture of powders obtained in step (a) at a treatment temperature;
   wherein the source of lithium ion used in step (a) has a melting point below the treatment temperature of step (b);
   and wherein:
   step (b) is carried out under inert atmosphere and the process further comprises a step (c) of heating the product of step (b) in the presence of oxygen for a period of time sufficient to eliminate the carbon material; or
   step (b) is carried out in the presence of oxygen and for a period of time sufficient to eliminate the carbon material.

2. The process of claim 1, which further comprises a step (b)(i) of mixing the product obtained in step (b) with a metal oxide or phosphate and a carbon material; and (b)(ii) heating the mixture obtained in (b)(i) at a second treatment temperature to obtain a second product, wherein the product of step (b) has a melting point above the treatment temperature of step (b)(ii).

3. The process of claim 1, wherein:
   the at least one metal oxide or phosphate is an oxide or phosphate of a metal selected from zirconium, titanium, germanium, gallium, tantalum, iron and niobium; or
   the at least one metal oxide or phosphate comprises at least two, or at least three, metal oxides or phosphates of metals selected from lanthanum, aluminum, zirconium, titanium, germanium, gallium, tantalum, iron and niobium, provided that at least one metal is lanthanum or aluminum.

4. The process of claim 1, wherein the at least one metal oxide or phosphate is an oxide of lanthanum or aluminum, the process further comprising a second metal oxide selected from zirconium oxide and titanium oxide, and optionally further comprising an oxide of an element selected from aluminium, germanium, gallium, tantalum, niobium, iron, barium, boron, and silicon.

5. The process of claim 1, wherein the mixing (a) further comprises a phosphate salt.

6. The process of claim 1, wherein the carbon material is selected from carbon black, graphene, graphite, carbon nanotubes, carbon fibers or nanofibers, and combinations thereof.

7. The process of claim 1, wherein the heating step is performed at a temperature of in the range of 800 to 1400° C.

8. The process of claim 1, wherein the mixing is performed by ball milling or in a planetary mixer.

9. The process of claim 1, wherein said ceramic has a residual carbon content below 10 wt. %.

10. The process of claim 9, wherein said ceramic comprises a compound selected from the compounds of Formulae (I) to (IV):

$$Li_7La_3Zr_2O_{12} \quad (I)$$

$$Li_{7-x}La_3Zr_2M_xO_{12} \quad (II)$$

$$Li_{3y}La_{(2/3)-y}Ti_{1-y'}M^{y'}_{y'}O_3 \quad (III)$$

$$Li_{1+z}Al_zM^x_{2-z}(PO_4)_3 \quad (IV)$$

wherein:
M is selected from Al, Ga, Ta, Fe, and Nb;
$M^x$ is selected from Ti and Ge;
$M^{y'}$ is selected from Ba, B, Al, Si and Ta;
x is greater than 0 and less than or equal to 1;
y is greater than 0 and less than or equal to 0.67;
y' is within the range of 0 to less than 1; and
z is within the range of 0 to 1;
wherein the compound may further comprise ionic vacancies.

11. The process of claim 10, wherein the compound is of Formula (I) or Formula (II).

12. The process of claim 10, wherein the compound is of Formula (III) or of Formula (IV).

13. The process of claim 11, wherein the compound is an undoped compound of Formula (I) having a cubic crystal structure.

14. The process of claim 1, wherein the lithium ion:carbon molar ratio being in the range of 0.5 to 2.4.

15. The process of claim 1, wherein said oxygen is present in air.

16. The process of claim 4, wherein the at least one metal oxide or phosphate is a lanthanum oxide.

17. The process of claim 6, wherein said carbon black is acetylene black.

18. The process of claim 1, wherein the heating step is performed for a period of time in the range of 30 minutes to 3 hours.

19. The process of claim 18, wherein the heating step is performed for a period of time in the range of 45 minutes to 1.5 hours.

20. The process of claim 18, wherein the heating step is performed for a period of time of about 1 hour.

21. The process of claim 8, wherein the mixing is performed by ball milling.

22. The process of claim 8, wherein the mixing is performed by ball milling performed in a zirconium dioxide container using zirconium dioxide balls.

23. The process of claim 9, wherein said ceramic has a residual carbon content below 5 wt. %.

24. The process of claim 11, wherein the compound of Formula (I) or Formula (II) has a tetragonal crystal structure or a cubic crystal structure.

25. The process of claim 12, wherein the compound is of Formula (III) and has a perovskite-type crystal structure.

26. The process of claim 12, wherein the compound is of Formula (IV) and has a NASICON-type crystal structure.

* * * * *